Oct. 6, 1931.  J. M. WILKINS  1,826,268
FLANGING TOOL
Filed May 15, 1929
Fig.1.
Fig.2.
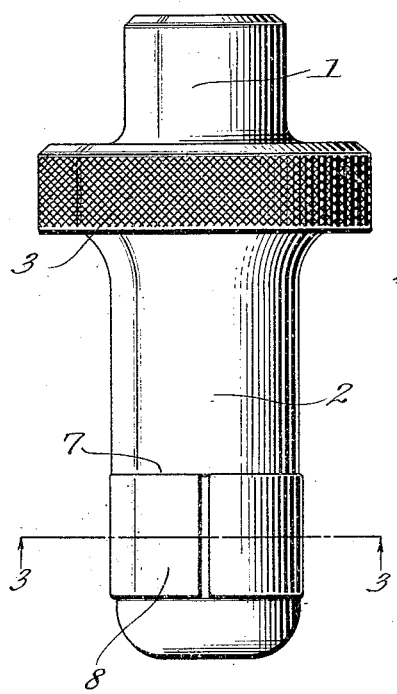
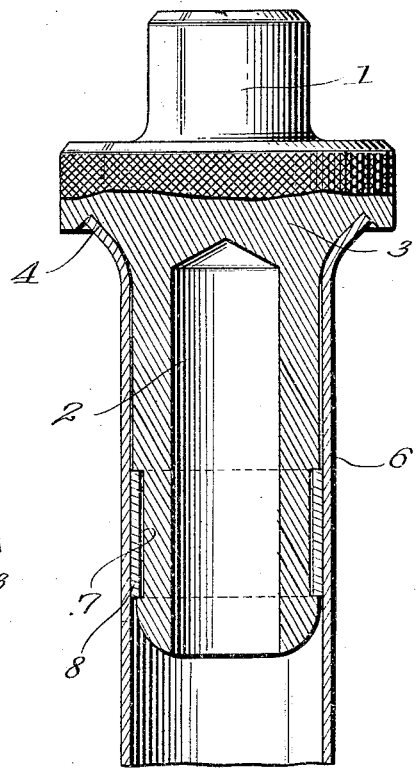
Fig.3.
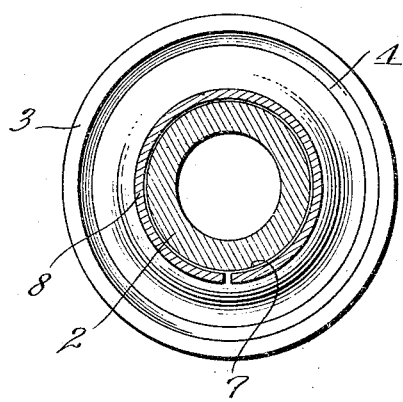
Inventor
James M. Wilkins.
By Cushman, Bryant & Darby
Attorneys Patented Oct. 6, 1931

1,826,268

UNITED STATES PATENT OFFICE

JAMES M. WILKINS, OF DECATUR, ILLINOIS, ASSIGNOR TO MUELLER CO., OF DECATUR, ILLINOIS, A CORPORATION OF ILLINOIS

FLANGING TOOL

Application filed May 15, 1929. Serial No. 363,244.

The present invention relates to flanging tools.

There are two outstanding disadvantages to the flanging tools in use today, in that there is a tendency to bulge the pipe or tube at a point even with the end of the tool, so that it is often difficult, and at times impossible, to slip the nut over the pipe or tube to come in contact with the flange thereof.

In order to insert the tool into the pipe or tube, it is necessary that there be a clearance between the periphery of the tool and the surrounding pipe or tube. The shank of the tool, therefore, being smaller than the inside diameter of the pipe or tube, the tool assumes a slight angle relative to the axis of the pipe or tube, which causes a two-point bearing, one on the flanging surface of the tool, and the other on the opposite side and extreme end of the tool shank. When pressure is exerted against the tool, the force will be taken by the wall of the pipe or tube which is in contact with the end of the tool, and will cause the pipe or tube to bulge.

The other disadvantage is that when the pipe or tube is not precisely round, difficulty is experienced in inserting the round shank of the tool therein.

With these situations clearly in mind, it is the object of the present invention to provide a flanging tool which will, under no circumstances, bulge the pipe or tube.

Another object of the invention is to provide a flanging tool which can be inserted into the pipe or tube whether it be rounded or misshapen.

Another object of the invention is to produce a flanging tool which will perform its function perfectly with the least amount of time and exertion.

Still another object of the invention is to provide a flanging tool simple in construction and inexpensive to manufacture.

With these and other objects in view, the invention is illustrated in the drawings, in which:

Figure 1 is a side view of the flanging tool,

Figure 2 is a side view partly in cross-section of the flanging tool, and

Figure 3 is a sectional view of the flanging tool on the line 3—3 of Fig. 1.

Referring specifically to the drawings, 1 indicates a boss which, in operation, is struck with a suitable hammer. A longitudinally tapered hollow body 2 is provided with a head 3 projecting directly radially from said body. The tapering body 2 terminates in a recess 4 adjacent the head 3. The longitudinal taper extends from the rounded lower end of the hollow body 2 to the recess 4. The taper beginning at the lower end of the hollow body 2 to a point just below the head 3 is slight and beginning at said point the taper becomes quite pronounced to its termination.

It will be noted that when the radial projection or shoulder at 4 is brought into contact with the end of the pipe or tube 6, and a longitudinal compression is applied to the tool, the flared end of the tube will be thickened under this compression.

It will be seen that the annular stop surrounding the body of the expander is of great importance. It insures that the end of the tube will be uniformly, preliminarily, expanded at all points in its circumference, and to a definite extent. Unless such stop were provided it would be very difficult to determine when the tube had been sufficiently expanded or to insure that all portions thereof were expanded to the same extent.

Substantially between the midpoint of the longitudinal tapering body 2 and the lower end thereof is a circumferential groove 7, to receive a split metallic ring 8, which is compressible but in its normal position extends slightly beyond the circumference of the tapering body.

With the flanging tool above described the lower portion of the longitudinal tapering member can be made somewhat smaller circumferentially than the pipe or tube to be flanged, and thereby overcome the difficulty of insertion, should the pipe or tube not be perfectly round. When the tool has been inserted to the point where the metallic ring member 8 is within the pipe or tube, the axes of the tool and tube or pipe will become aligned, and maintain this relative position throughout the expanding operation which prevents the two-point bearing and subsequent bulging of the pipe or tube.

It is understood that changes may be made by those skilled in the art in the structure of the invention without departing from the spirit and scope of the appended claims.

What I claim is:

1. A flanging tool comprising a head, a longitudinal body having a circumferential groove therein, and a ring to fit in said groove.

2. A flanging tool comprising a head, a longitudinal body having a circumferential groove near the lower end thereof and a ring to fit in said groove.

3. A flanging tool comprising a head, a longitudinal body having a circumferential groove therein, and a compressible ring to fit in said groove.

4. A flanging tool comprising a head, a longitudinal body having a circumferential groove therein and a split ring to fit in said groove.

5. A flanging tool comprising a head, a longitudinally tapered hollow body integral therewith having a circumferential groove near the lower end thereof, and a split ring to fit in said groove.

6. In a flanging tool for tubes, a head, a longitudinal body adapted to be inserted into the end of a tube and having a circumferential groove, and compressible means in the groove in said longitudinal body to maintain the axes of said longitudinal body and said tube parallel.

7. In a flanging tool for tubes, a head, a longitudinal body adapted to be inserted into the end of a tube and having a circumferential groove near the lower end of said longitudinal body, and compressible means in the groove to maintain the axes of said longitudinal body and said tube parallel.

8. In a flanging tool for tubes, a head, a longitudinal body adapted to be inserted into the end of a tube and having a circumferential groove, and a split ring in the groove in said longitudinal body to maintain the axes of said longitudinal body and said tube parallel.

9. In a flanging tool for tubes, a head, a longitudinal body adapted to be inserted into the end of a tube and having a circumferential groove near its lower end, and a split ring in the groove of said longitudinal body to maintain the axes of said longitudinal body and said tube parallel.

10. In a flanging tool for tubes, a head, a longitudinally tapered hollow body adapted to be inserted into the end of a tube and having a circumferential groove near the lower end and a split ring in the groove of said longitudinally tapered hollow body to maintain the axes of said longitudinally tapered hollow body and said tube parallel.

11. A flanging tool comprising a head, a longitudinal body, and means immovable longitudinally on said last-named member to enlarge the circumference thereof.

12. A flanging tool comprising a head, a longitudinally tapered body, and means immovable longitudinally on said last-named member to enlarge the circumference thereof.

13. A flanging tool comprising a head, a longitudinal body and compressible means immovable longitudinally on said last-named member to enlarge the circumference thereof.

14. A flanging tool comprising a head, a longitudinal body, and means immovable longitudinally near the lower end of said last-named member to enlarge the circumference thereof.

15. In a flanging tool for tubes, a head, a longitudinal body adapted to be inserted into the end of a tube, and means immovable longitudinally on said longitudinal body to maintain the axes thereof and of said tube parallel.

16. In a flanging tool for tubes, a head, a longitudinally tapered body adapted to be inserted into the end of a tube, and means immovable longitudinally on said longitudinally tapered body to maintain the axes thereof and of said tube parallel.

17. In a flanging tool for tubes, a head, a longitudinally tapered body adapted to be inserted into the end of a tube, and compressible means immovable longitudinally on said longitudinally tapered body to maintain the axes thereof and of said tube parallel.

In testimony whereof I have hereunto set my hand.

JAMES M. WILKINS.